March 31, 1959 E. W. VREDENBURG 2,879,970
WEIGHING MECHANISM

Filed May 20, 1954 4 Sheets-Sheet 1

INVENTOR.
Edric W. Vredenburg
ECKHOFF & SLICK
ATTORNEYS
BY Robert D. Slick
A MEMBER OF THE FIRM March 31, 1959    E. W. VREDENBURG    2,879,970
WEIGHING MECHANISM
Filed May 20, 1954    4 Sheets-Sheet 2
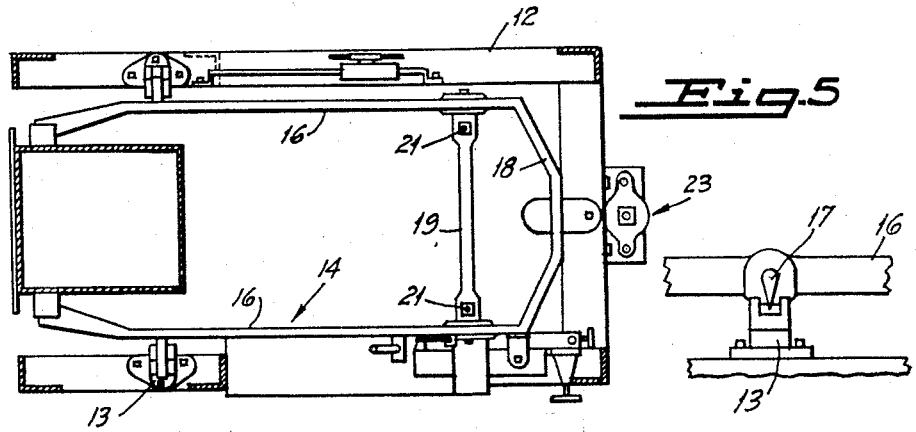
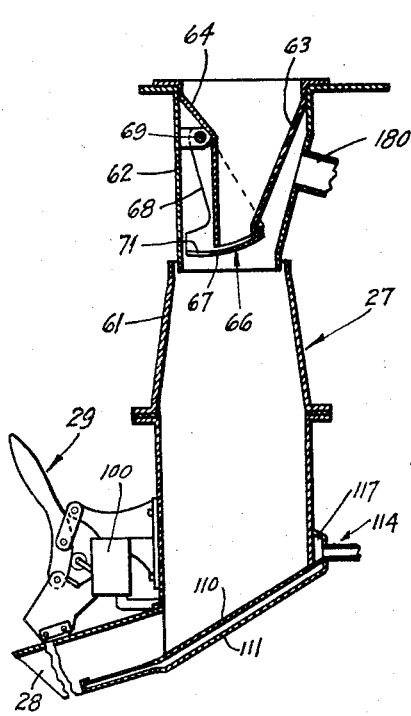
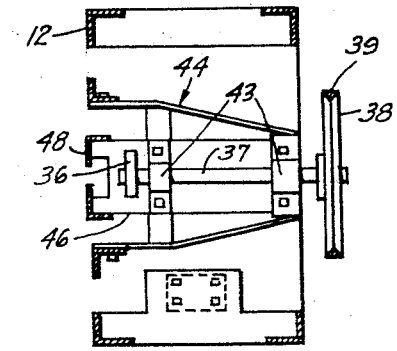
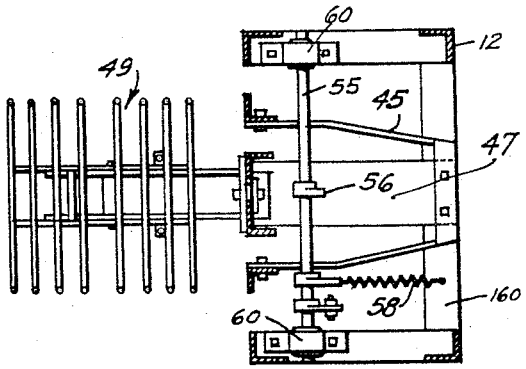
INVENTOR.
Edric W. Vredenburg
ECKHOFF & SLICK
ATTORNEYS

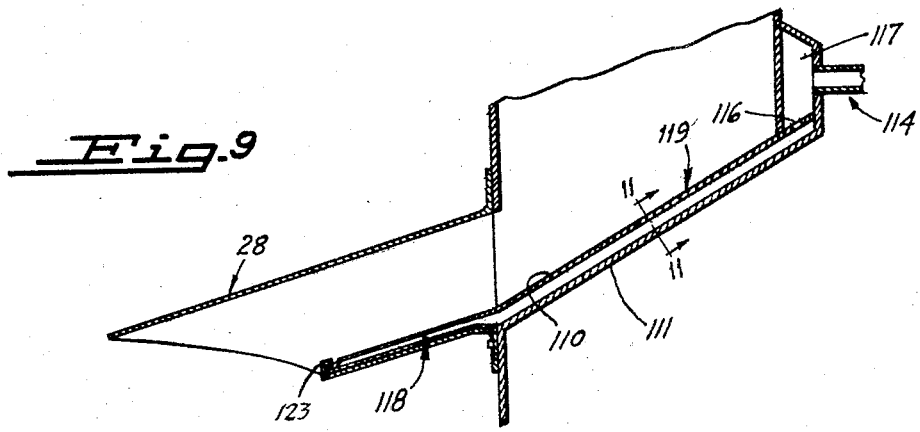
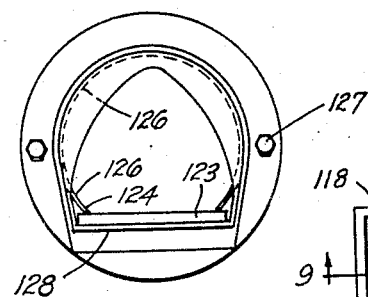
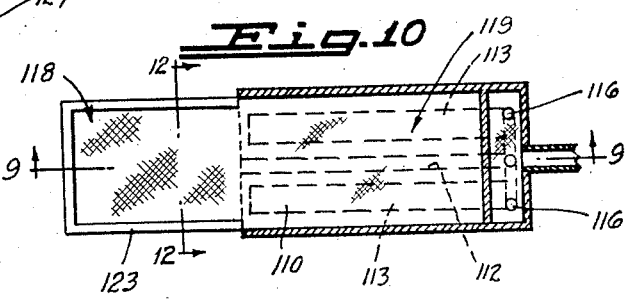
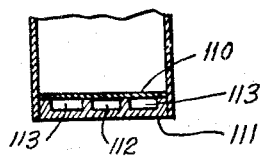
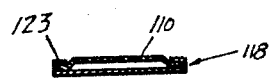

March 31, 1959 E. W. VREDENBURG 2,879,970
WEIGHING MECHANISM
Filed May 20, 1954 4 Sheets-Sheet 4
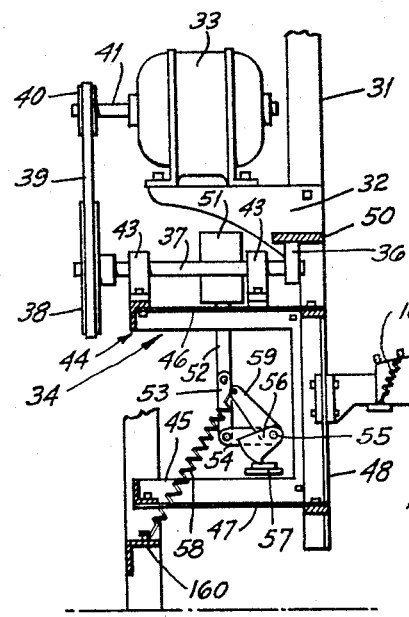
Fig.13
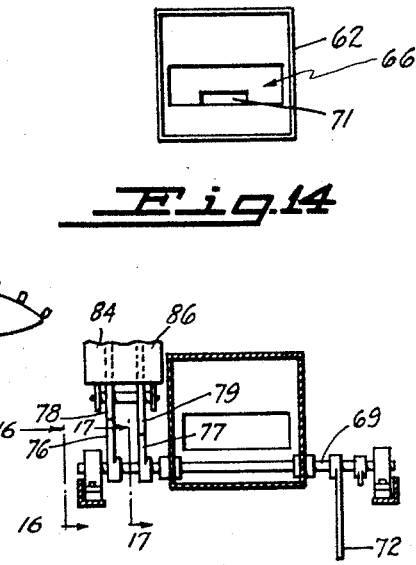
Fig.14
Fig.15
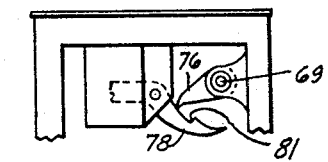
Fig.16
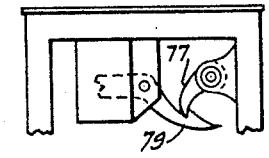
Fig.17
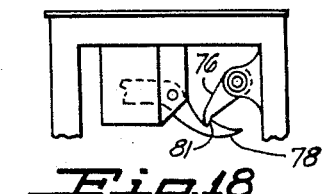
Fig.18
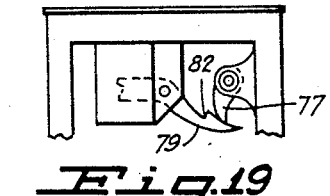
Fig.19
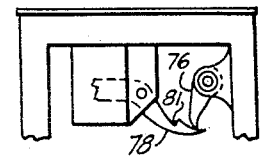
Fig.20
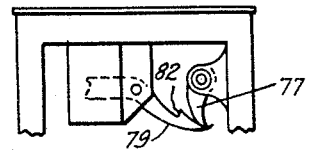
Fig.21
INVENTOR.
Edric W. Vredenburg
BY ECKHOFF & SLICK
ATTORNEYS
BY
A MEMBER OF THE FIRM

United States Patent Office 2,879,970
Patented Mar. 31, 1959

2,879,970

WEIGHING MECHANISM

Edric W. Vredenburg, Oakland, Calif.

Application May 20, 1954, Serial No. 431,022

1 Claim. (Cl. 249—60)

This invention relates to an improved weighing and container-filling mechanism, particularly one which can be utilized to feed a predetermined weight of a material into a container such as a valved-bag.

The machine of the present invention is particularly suited to the handling of those finely divided solid materials which do not flow readily into a container and which therefore, are relatively difficult to handle.

It is in general the broad object of the present invention to provide a novel machine enabling finely divided solid materials to be weighed and packed simultaneously into a container such as a bag, and this expeditiously and accurately.

A further object of the present invention is to provide a novel feed mechanism for use in a batch-weighing and filling machine.

The invention includes other objects and features of advantage, some of which, together with the foregoing, will appear hereinafter wherein the present preferred form of filling and weighing machine of this invention is disclosed.

In the drawing accompanying and forming a part hereof, Figure 1 is a plan view of the assembled machine.

Figure 4 is a section taken along the line 4—4 in Figure 2.

Figure 5 is a fragmentary side view of a portion of the weighing beam support.

Figure 6 is a section taken along the line 6—6 in Figure 2.

Figure 7 is a section taken along the line 7—7 in Figure 2.

Figure 8 is a section through the feed hopper and bag-filling mechanism taken along the line 8—8 in Figure 3.

Figure 9 is a section taken along the line 9—9 of Figure 10 and showing a portion of the structure utilized to feed air into the stream undergoing batch weighing and transport into the bag.

Figure 10 is a plan view of the air feed structure.

Figure 11 is a section taken along the line 11—11 in Figure 9.

Figure 12 is a section taken along the line 12—12 in Figure 10.

Figure 13 is a side view of the bag shaking mechanism partly in section.

Figure 14 is a plan view of the hopper, the hopper valve being in position for dribble feed.

Figure 15 is a plan view of a portion of the feed mechanism.

Figures 16 and 17 are, respectively, fragmentary sections taken along the lines 16—16 and 17—17 in Figure 15, showing the control mechanism for the hopper valve with the latter in full feed position.

Figures 18 and 19, respectively, correspond to Figures 16 and 17 with the hopper valve in position for a dribble feed.

Figures 20 and 21 correspond to Figures 16 and 17, respectively, but the levers are shown in that position in which the valve controlling feed from the hopper is closed.

Figure 22 is a front view of the spout shown in Figure 9.

Referring particularly to the drawings, the machine includes a suitable framework, generally indicated at 12 and made up of a plurality of suitable structural members welded together to provide a frame for the machine.

Figure 1:
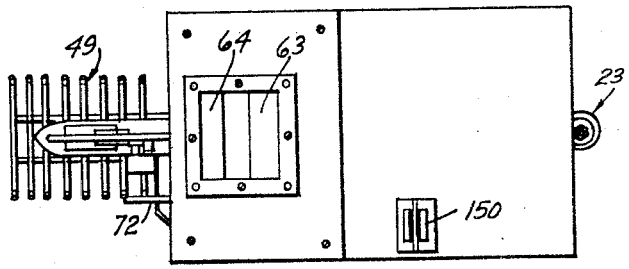
Figures 2, 3:
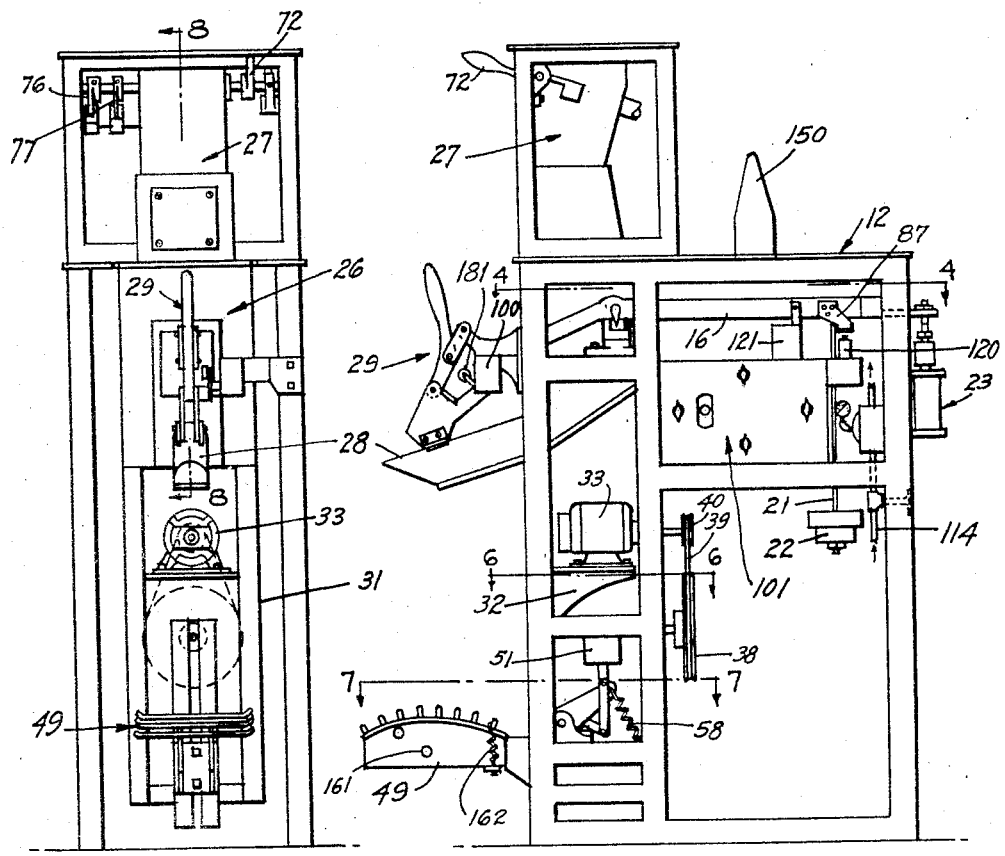
Figure 2 is a side elevation of the machine shown in Figure 1.
Figure 3 is a front elevation of the machine.

Pivot blocks 13 are provided upon opposite sides of an upper portion of framework 12 (Figures 2, 4 and 5) as a support for a weighing frame, generally indicated at 14. The frame 14 includes spaced parallel arms 16 having knife edges 17 riding on the pivot blocks 13. The arms 16 are joined at their rear ends by a first cross-member 18 by a second cross-member 19, from which rod 21 depends to support counterweights 22. A dash-pot mechanism, generally indicated at 23, is attached to the rear end of the weighing frame 14 to dampen its movement.

At its forward end, the weighing frame 14 hingedly supports a depending bag support and bag filling mechanism generally indicated at 26, and including at its upper end a feed hopper structure, generally indicated at 27, the latter terminating in a bag-filling spout 28 formed to receive the valve end of a bag; the bag valve is retained in place against the spout by toggle locking mechanism, generally indicated at 29 (a suitable structure mechanism for this is disclosed in my prior Patent 2,392,204). A projection 181 on the toggle mechanism opens and closes a cooperatively positioned switch 100 which controls operation of a timing mechanism 101, as will appear.

The bag support and bag filling mechanism 26 includes a rectangular frame 31 depending vertically from the forward end of the arms 16 and providing a support for a bracket 32, upon which is mounted an electric motor 33, the latter serving to operate the bag oscillating mechanism, generally indicated at 34. The mechanism 34 includes an eccentric roller 36 mounted upon a shaft 37, the latter having a shive 38 thereon driven by a belt 39 which is also extended above a shive 40 on motor shaft 41.

Shaft 37 is mounted in pillow blocks 43 carried upon a bracket generally indicated at 44 and secured to the frame 31. A like bracket 45 is secured below bracket frame 31. Spring plates 46 and 47 are secured at their rear edges to each of the brackets. At their forward end, the spring plates support a pair of spaced vertical plates 48 carrying bag chair 49. At their upper end, plates 48 carry a member 50 which rides upon the eccentric roller 36.

When motor 33 is energized, the eccentric roller 36 rotates and so shakes or jiggles a bag on the bag chair 49. The motor 33 is only energized, however, when rectangular frame 31 is secured against movement and, to this end, a spring 58 is extended between a member of the framework 12 and an arm 59 on shaft 55 to maintain a cam 56 on shaft 55 in contact with follower 57 on frame 31 and so force the frame 31 down and into a fixed position in which bracket 47 is brought into engagement with a fixed cross-member 160 on the framework 12 (Figure 13) whereby the weighing frame 14 and frame 31 are locked and the vibration of a bag on the bag chair is independent of the support provided for the weighing frame 31 and frame 14.

To permit the frame 31 to move freely, a solenoid 51 is mounted on framework 12. Solenoid 51 has a plunger therein, not shown, from which a rod 52 extends and which is engaged with a link 53 at one end thereof. The other end of link 53 is joined to an arm 54 secured on a shaft 55; shaft 55 extends transversely of the framework 12 and is mounted in suitable pillow blocks 60 on each side of the framework 12. When the solenoid is energized, the cam 56 is held free of follower 57 and the frame 31 can swing freely.

Referring to Figures 8 and 14 through 20, the feed hopper structure 27 includes an upwardly extending fixed portion 61 which fits over the downwardly depending portion of a chute 62, the latter being mounted on the upper end of frame 31 (Figures 4 and 8). Deflector plates 63 and 64 are provided within the chute 62 for cooperative feed of material, as will be explained, with the feed control valve 66. The feed control valve includes an arcuate portion 67 secured between opposite arms 68 secured to transverse shaft 69 and fitting across the throat provided by the sidewalls of chute 62 and plates 63 and 64; the arcuate portion 67 includes a cut-out or dribble feed portion 71.

The rectangular bottom of chute 61 and the bottom of spout 28 respectively extend at an acute angle of about 30° and about 15° to the horizontal, the upper face on the chute and spout being provided with a porous canvas channelled plate 110 having a passage 112 supplying air to portion 118 of the canvas closure beneath the spout and passages 113 each supplying air to portion 119 of the canvas closure below the chute 61 (Figure 10). In its forward portion 118, the canvas closure 110 is secured by a metal flange 123, which fits beneath the lower edge 124 of an arcuate guide plate 126 in spout 28. The spout 28 is detachably secured by studs 127 to frame 31, with the forward portion 118 extending into the spout and covering spout bottom 128. Various sizes and shapes of spouts can be employed as desired. Air is supplied continuously from feed mechanism 114 at about two pounds per square inch pressure to the space between the plate and the porous canvas closure 110 through air inlets 116 and the distributing duct 117. The air issues through the outlet port 180.

To control operation of the device, a release or setting lever 72 is provided on shaft 69 at one end, while at its other end, the shaft includes a pair of dogs 76 and 77 cooperating, respectively, with notched levers 78 and 79; notches 81 and 82 in levers 78 and 79 are staggered, for reasons which will appear. Each of levers 78 and 79 includes a projecting end which is moved selectively by solenoids indicated at 84 and 86.

The operation of the device and further details of its construction will become further apparent from a consideration of the following further description of the device and its operation.

When a bag is placed with its valve on the spout 28, the bag lock 29 is closed to secure the bag in place, switch 100 returns timing mechanism, generally indicated at 101, to its starting position, the solenoid 51 is energized and the frame 31 swings freely. When the operator rocks the release or set lever 72 clock-wise in Figures 2, 16–19, shaft 69 is turned to move the dogs 76 and 77 to the positions in which they appear in Figures 16 and 17, and in which dog 77 is engaged with notch 82 in lever 79. In this position of shaft 69, the feed control valve is moved to provide a full-throat open position, as in Figure 16. The shaft 69 and valve 66 remain in this position until the bulk of the feed material has passed through the filling hopper into the bag. Upon this occurrence, weighing frame 14 moves on its pivot support and extension 87 moves switch 120 to energize solenoid 86. This energization of the solenoid enables it to lift dog 77 from its engagement with notch 82, permitting shaft 69 to rock partially, under the bias of the feed control valve 66, and move the arcuate portion of the valve 66 into dribble position in which it appears in Figure 14. The dribble feed continues until the full weight of material is within the hopper and the bag, whereupon the weighing frame 14 closes switch 121 and energizes a circuit including solenoid 84 and dog 78 is released from its engagement with notch 81. This permits the levers to move into the position in which they appear in Figures 20 and 21, and in which the throat of the feed hopper is fully closed. The closing of switch 121 also results in de-energization of the solenoid 51 and the clamping of the weighing frame in its closed position by spring 58, and energization of motor 33 under the control of the timer 101. The rotation of the motor continues for some seconds under control of timer 101, during which the material in the hopper is caused to flow into the bag while material in the bag is shaken and compacted within the bag. When the shaking cycle is complete, the timer opens the circuit to the motor and closes a circuit to solenoid 51 and the weighing frame 14 is free to swing on the pivot blocks with the fully loaded bag in place. The "over-and-under" check device 150 can then be observed to check the weight of the loaded bag. When the operator releases the toggle mechanism the fully loaded bag falls forward off the bag chair, the chair tilting momentarily about a pivot pin 161 and being returned by the pull of spring 162.

During all the foregoing, a stream of air has been flowing through the porous canvas 110 into the hopper 27 to fluidize material falling through that hopper. Initially, the hopper 27 is, of course, completely free of solid material. When the valve 66 is moved to open position, the bulk of material falls forcefully from the supply hopper above and flows down hopper 27 and on through the spout 28, skidding off of the canvas plate 110 so rapidly that a third of the bag is filled in a couple of seconds. As flow continues, the material will compact in the hopper; however, because the flow of air is constant and because the hopper is filled with air which is constantly replenished, the material quickly becomes aerated and flows freely into the spout 28 and thence into the bag. When the bulk feed is shut off, the material is flowing out of the hopper and through the spout at a rate greater than the dribble feed rate so that the level of material in the hopper falls quickly and the dribble feed skids off the closure 110 and into the bag, thus enabling the overall cycle of loading to be reduced to a minimum of time. For example, utilizing the equipment on lampblack, the filling time of 50 pound bags was at a sustained rate of four bags per minute with an accuracy of plus or minus two ounces per bag. A typical cycle includes a five-second bulk feed, a four-second dribble feed, and a three to five second settling. The air release through the canvas plate maintains a very low coefficient of friction with the material flowing over it; the effect of the air has been likened to that of a very effective lubricant.

From the foregoing, I believe it will be apparent that I have provided a novel, simple and improved weighing mechanism for solid materials such as pelletized lampblack.

I claim:

In a filling device for weighing a finely divided solid into a valved bag including a stationary frame; a vertical hopper fixedly secured to said frame; side walls defining a passage positioned below said hopper; a spout providing an exit from the bottom of said passage into said valved bag when said bag is positioned on said spout; a substantially foraminous bottom on the lowermost wall of said passage positioned at an acute angle to the horizontal and in direct contact with material passing downwardly through said passage; means for supplying air continuously to the lower side of said foraminous bottom for passage therethrough whereby to aerate material falling gravitationally in said passage and traversing said spout;

a weighing frame supporting said passage and said spout, said weighing frame being balanced on said stationary frame; a valve mounted in said hopper controlling feed from said hopper; means controlled by movement of the weighing frame for moving said valve first to an open position to provide a bulk feed, then from an open position to a partially closed position to provide a dribble feed and finally to a closed position when a predetermined weight is reached; means for vibrating the lower portion of a bag secured to said spout; a cam follower secured to said weighing frame; a cam having a lobe thereon adjacent said follower secured on said stationary frame; means for moving said cam lobe into contact with said cam follower to move said weighing frame; a stop member fixed to said stationary frame on the far side of said weighing frame opposite said cam lobe a distance from said weighing frame such that when said cam lobe engages said cam follower and said weighing frame is moved thereby, said weighing frame contacts said stop member whereby said weighing frame is locked between said cam lobe and said stop member; and means operable by said weighing frame when a predetermined weight is reached for permitting said cam lobe moving means to advance said lobe to contact said cam follower whereby to move and lock said weighing frame between said cam lobe and said stop member when a predetermined weight of material has been weighed; and means for actuating said vibrating means to apply a vibratory force to said valved bag as said predetermined weight is reached, said valve is moved to a closed position and said weighing frame is locked.

References Cited in the file of this patent

UNITED STATES PATENTS

| | | |
|---|---|---|
| 1,852,376 | Rees | Apr. 5, 1932 |
| 2,076,617 | Cleaves | Apr. 13, 1937 |
| 2,097,551 | Garlinghouse | Nov. 2, 1937 |
| 2,116,934 | Rapp | May 10, 1938 |
| 2,181,756 | Cook | Nov. 28, 1939 |
| 2,232,437 | Bushman | Feb. 18, 1941 |
| 2,346,882 | Vredenburg | Apr. 18, 1944 |
| 2,402,217 | Vredenburg | June 18, 1946 |
| 2,723,054 | Louden et al. | Nov. 8, 1955 |